Aug. 4, 1931.   W. G. ROGERS   1,817,848
MOTOR VEHICLE
Filed March 12, 1930
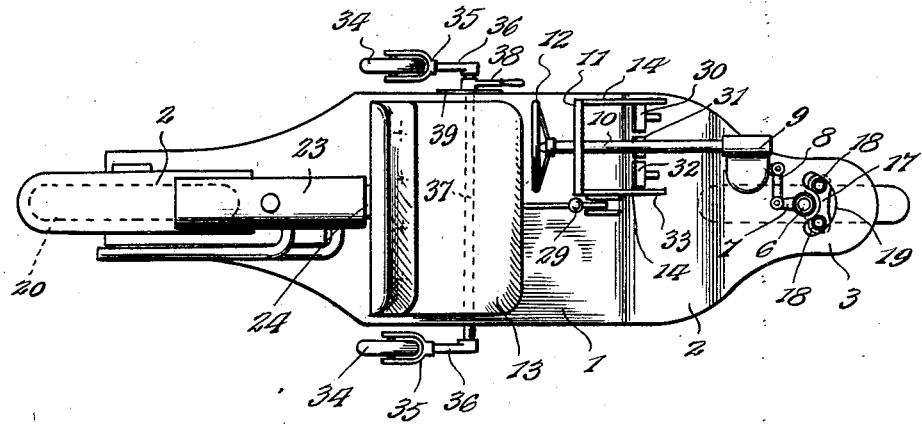
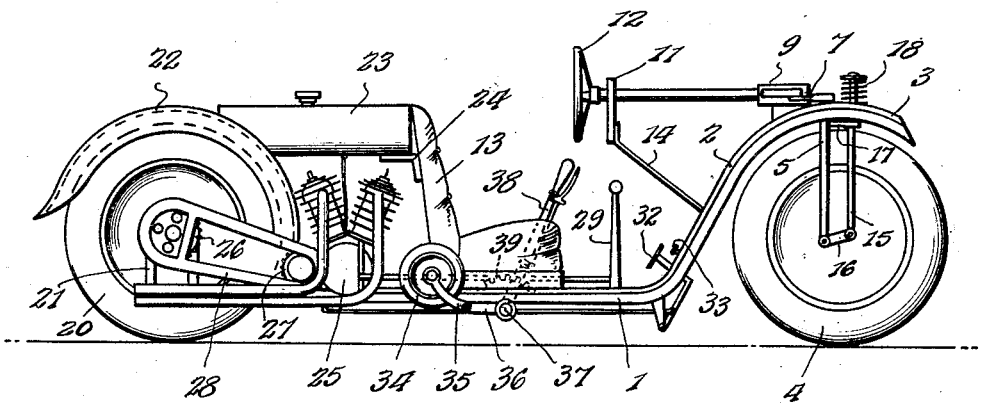
Inventor
Walter G. Rogers.
By Lacey & Lacey,
Attorneys Patented Aug. 4, 1931  1,817,848

UNITED STATES PATENT OFFICE

WALTER G. ROGERS, OF LEAVENWORTH, KANSAS

MOTOR VEHICLE

Application filed March 12, 1930. Serial No. 435,339.

This invention relates to motor vehicles and more particularly to a vehicle of small size and capable of being driven by a motor of the type generally used upon a motorcycle.

One object of the invention is to so form this vehicle that it will be of a compact construction and of a height and length not much greater than a motorcycle, thereby providing a vehicle capable of being easily parked or stored in a small space.

Another object of the invention is to so form the vehicle that the operator thereof may occupy a seat similar to those used in automobiles and thereby provide a vehicle which will be comfortable and may be driven without the operator becoming tired.

Another object of the invention is to permit an engine of the motorcycle type to be used as the motive power of the vehicle and thereby reduce the cost of operation while at the same time producing a vehicle capable of high speed.

Another object of the invention is to produce a motor vehicle of small dimensions in which the steering mechanism and control means for the motor are of a construction similar to those used upon large machines so that any one familiar with the operation of an automobile may easily operate the improved vehicle.

Another object of the invention is to provide a motor vehicle of small dimensions which is evenly balanced and not liable to easily turn over when in motion and also to provide the vehicle with improved means movable into engagement with the ground at opposite sides thereof to retain the vehicle in an upright position when not in motion and capable of being shifted upwardly out of engagement with the ground when the vehicle is in motion.

The invention is illustrated in the accompanying drawings, wherein

Figure 1 is a top plan view of the improved motor vehicle, and

Fig. 2 is a side elevation thereof.

The platform 1 which constitutes the body of the motor vehicle may be formed of wood, metal or any other desired material and has its forward portion extended upwardly at an incline, as shown in Figure 2, and terminating in a reduced end 3 which is curved longitudinally in order to fit properly over the front wheel 4. This wheel is rotatably mounted in front forks 5, the post 6 of which extends upwardly through the reduced forward end of the platform and at its upper end carries a lever or side arm 7 to which is attached a link 8 leading from a steering gear unit 9. The steering gear unit is of a conventional construction and from this unit extends a steering post 10 which projects rearwardly over the platform through an instrument panel 11. A steering wheel 12 is mounted at the rear end of the steering post and this wheel is located in front of a driver's seat 13 erected upon the platform intermediate the length thereof. It will thus be seen that the steering wheel will be located in front of the driver's seat where it may be easily reached by the operator of the vehicle. Supporting arms or struts 14 extend downwardly from the instrument panel at a forward incline and are secured to the upwardly inclined portion 2 of the platform. Rods 15 which are pivoted to links 16 of the forks 5 extend upwardly at opposite sides of the front wheel through openings formed in a plate 17 projecting forwardly from the forks and about the upper end portions of these rods are disposed springs 18 in order to absorb shocks when passing over rough roads during operation of the vehicle. A block 19 is formed in the reduced forward end of the platform to receive the rods and springs and thereby allow the front wheels to be turned in order to guide the vehicle.

The rear wheel 20 is rotatably mounted at the back of the platform between brackets 21 extending upwardly therefrom at opposite sides of a longitudinally extending slot into which the wheel fits and a mudguard 22 is provided for this rear wheel which serves not only as a mudguard but also as a support for the rear end of a fuel tank 23, the forward end of which is supported upon a bracket 24 carried by the back of the driver's seat. Between the mudguard and the driver's seat is mounted an engine 25 of the type usually applied to motorcycles and sprocket wheels 26 and 27 are carried by the rear wheel and engine in order that rotary motion may be transmitted to the rear wheel through the medium of a belt or sprocket chain shielded by a guard 28. This motor is of a conventional construction and in order to control operation thereof there has been provided a gear shift lever 29 and pedals 30, 31 and 32. The gear shift lever extends upwardly from the platform in front of the driver's seat and the pedals 30, 31 and 32 which are respectively a clutch pedal, starter pedal and brake pedal are mounted through the inclined portion 2 of the platform near the lower end thereof. These pedals are disposed at the driver's side of the vehicle where they may be easily reached by the operator and there is also provided an accelerator 33 which extends through the platform near the pedal 32. Therefore, the vehicle will be provided with equipment for controlling its motor having a standard construction and any one familiar with the operation of an automobile may easily operate the vehicle.

When the vehicle is in motion, its speed retains it in an upright position but when it is not in motion it will have a tendency to tilt toward one side. It is, therefore, necessary to provide means for retaining the vehicle in an upright position when it is parked or temporarily stopped, and in order to do so, I have provided balancing wheels 34 disposed at opposite sides of the platform and rotatably mounted in forks 35, the shanks 36 of which are fixed upon the ends of a shaft 37. This shaft extends transversely of the platform beneath the same and is rotatably mounted in suitable bearings. A latch lever 38 extends upwardly from the shaft at the driver's side of the platform and carries a tooth for engagement with a rack 39 fixed to the platform. Therefore, when the vehicle is to be brought to a stop, the operator may draw the latch lever rearwardly and by doing so swing the forks 35 downwardly so that the wheels 34 rest upon the ground and prevent the vehicle from tilting out of an upright position with resulting likelihood of its falling over on one side. When the vehicle is again started, the latch lever is thrust forwardly to rest the wheels and since it engages the rack the wheels will be retained in an elevated position. I have, therefore, provided a motor vehicle which is of small dimensions and of a compact constructon and capable of being operated at a high rate of speed at a low cost.

Having thus described the invention, I claim:

1. A motor vehicle comprising a platform, a traction wheel at the rear of said platform, a mud guard for the rear wheel, a front wheel, forks for the front wheel pivotally carried by said platform, steering mechanism carried by said platform and operatively connected with said forks, a driver's seat resting upon said platform intermediate the length thereof with its back spaced forwardly from the rear wheel, a motor upon said platform between the seat and rear wheel, a fuel tank disposed over said motor longitudinally of the platform with its rear end supporting upon the rear mud guard, a support for the front end of the fuel tank carried by the back of said seat, and motor controls extending upwardly through the platform in front of said seat.

2. A motor vehicle comprising a platform horizontal for a portion of its length and having its front portion extending upwardly at a forward incline, a rear wheel rotatably mounted at the back of said platform, a front wheel, forks for the front wheel having a post extending upwardly through the front portion of said platform and rotatably mounted, a driver's seat upon said platform intermediate the length of its horizontal portion, an engine upon the platform between the seat and rear wheel, an instrument board in front of said seat, supporting arms for said board extending forwardly from the board and secured to the front portion of said platform, steering means connected with said post and including a shaft extending rearwardly through the instrument board and rotatably supported thereby and having a hand wheel at its rear end in front of the driver's seat, and control means for said engine including actuating elements extending upwardly through the platform in front of said seat below the instrument board.

In testimony whereof I affix my signature.

WALTER G. ROGERS. [L. S.]